(12) United States Patent
Abe

(10) Patent No.: US 8,478,070 B2
(45) Date of Patent: Jul. 2, 2013

(54) INFORMATION PROCESSING APPARATUS, BLOCK DETECTION METHOD, AND PROGRAM

(75) Inventor: Hiroshi Abe, Tokyo (JP)

(73) Assignee: Sony Corporation (JP)

(*) Notice: Subject to any disclaimer, the term of this patent is extended or adjusted under 35 U.S.C. 154(b) by 467 days.

(21) Appl. No.: 12/802,823

(22) Filed: Jun. 15, 2010

(65) Prior Publication Data

US 2011/0013809 A1    Jan. 20, 2011

(30) Foreign Application Priority Data

Jul. 15, 2009    (JP) ................ P2009-167040

(51) Int. Cl.
*G06K 9/36*    (2006.01)
*G06K 9/00*    (2006.01)
*G06K 9/46*    (2006.01)
*G06K 9/66*    (2006.01)

(52) U.S. Cl.
USPC ............... 382/281; 382/115; 382/190

(58) Field of Classification Search
None
See application file for complete search history.

(56) References Cited

U.S. PATENT DOCUMENTS

| 7,397,970 B2 * | 7/2008 | Han et al. ............... 382/281 |
| 2008/0232713 A1 | 9/2008 | Iizuka |
| 2010/0040265 A1 * | 2/2010 | Iizuka ............... 382/128 |

FOREIGN PATENT DOCUMENTS

JP    2008-269629 A    11/2008

OTHER PUBLICATIONS

Sonka et al. "Image processing, analysis, and machine vision", $2^{nd}$ edition, Brooks/Cole publishing company, 1999, Sec. 5.2.6, p. 163.*

* cited by examiner

*Primary Examiner* — Tom Y Lu
*Assistant Examiner* — Thomas Conway
(74) *Attorney, Agent, or Firm* — Lerner, David, Littenberg, Krumholz & Mentlik, LLP

(57) ABSTRACT

There is provided an information processing apparatus according to the present invention including a Hough transform unit executing the Hough transformation on a biometrics image which is image information unique to a living body, and a block detection unit detecting whether a block having a predetermined shape is included in a Hough space image which is a Hough-transformed biometrics image, outputting present position information representing a position at which the block is located in the Hough space image when the block is determined to be included in the Hough space image.

7 Claims, 14 Drawing Sheets

FIG. 11

| BLOCK | | OUTPUT COORDINATE |
|---|---|---|
| DIAGONAL LINE BLOCK | DIAGONALLY RIGHT DOWN | COORDINATE AT UPPER LEFT END OF BLOCK |
| | DIAGONALLY RIGHT UP | COORDINATE AT LOWER LEFT END OF BLOCK |
| HORIZONTAL LINE BLOCK (HORIZONTALLY ARRANGED) | | COORDINATE AT LEFT END OF BLOCK |
| VERTICAL LINE BLOCK (VERTICALLY ARRANGED) | | COORDINATE AT TOP END OF BLOCK |

FIG. 12

ENCODED DATA OF HOUGH SPACE BINARY IMAGE

| No. | BLOCK | COORDINATE | NUMBER OF UNIT BLOCKS |
|---|---|---|---|
| 1 | 135° | $(\rho_1, \theta_1)$ | 11 |
| 2 | 135° | $(\rho_2, \theta_2)$ | 11 |
| 3 | 135° | $(\rho_3, \theta_3)$ | 5 |
| ⋮ | ⋮ | ⋮ | ⋮ |
| 10 | 45° | $(\rho_{10}, \theta_{10})$ | 8 |
| 11 | 45° | $(\rho_{11}, \theta_{11})$ | 5 |
| ⋮ | ⋮ | ⋮ | ⋮ |
| 20 | 0° | $(\rho_{20}, \theta_{20})$ | 4 |
| 21 | 0° | $(\rho_{21}, \theta_{21})$ | 2 |
| ⋮ | ⋮ | ⋮ | ⋮ |
| 25 | 90° | $(\rho_{25}, \theta_{25})$ | 4 |
| 26 | 90° | $(\rho_{26}, \theta_{26})$ | 2 |
| ⋮ | ⋮ | ⋮ | ⋮ |

INFORMATION PROCESSING APPARATUS, BLOCK DETECTION METHOD, AND PROGRAM

CROSS-REFERENCE TO RELATED APPLICATION

The present application claims priority from Japanese Patent Application No. JP 2009-167040 filed in the Japanese Patent Office on Jul. 15, 2009, the entire content of which is incorporated herein by reference.

BACKGROUND OF THE INVENTION

1. Field of the Invention

The present invention relates to an information processing apparatus, a block detection method, and a program.

2. Description of the Related Art

In recent years, individual identification techniques using biometrics authentication have begun to be introduced. In the individual identification techniques using biometrics authentication (hereinafter referred to as biometrics authentication), biometrics authentication data used for authentication is registered as a template in advance. During the authentication, the previously registered template is collated with biometrics authentication data generated during the authentication.

Normally, in the biometrics authentication, the template used for authentication stores a two-dimensional pattern such as a fingerprint and a vein, and the authentication processing is executed using this two-dimensional image information. In order to improve the accuracy of the authentication processing, Japanese Patent Application Laid-Open No. 2008-269629 suggests a method including the steps of: applying the Hough transformation to the template and the biometrics image generated during the authentication; and authenticating each image to which the Hough transformation has been applied.

By the way, when the authentication processing using the Hough transformation is performed, the number of steps for the authentication processing can be reduced by registering Hough-transformed biometrics images as templates in advance, instead of applying the Hough transformation to the template on each occasion. However, a Hough-transformed image tends to have a larger data capacity than an image in xy-plane to which the Hough transformation has not yet been applied. Accordingly, when a medium with limited capacity such as an IC card stores Hough-transformed images, there is an issue in that the Hough-transformed images are not appropriate in terms of the amount of data. Therefore, it has been desired to develop a method for reducing the amount of data by compressing Hough-transformed images.

In light of the foregoing, it is desirable to provide an information processing apparatus, a block detection method, and a program capable of reducing the amount of data of Hough-transformed images.

According to an embodiment of the present invention, there is provided an information processing apparatus including a Hough transform unit executing Hough transformation on a biometrics image which is image information unique to a living body, and a block detection unit detecting whether a block having a predetermined shape is included in a Hough space image which is a Hough-transformed biometrics image, outputting present position information representing a position at which the block is located in the Hough space image when the block is determined to be included in the Hough space image.

The block may include a plurality of unit blocks, each having a predetermined size, which are connected with a predetermined inclination, and the block detection unit may detect the block by using a plurality of types of blocks in which the unit blocks are connected in different manners and by using a plurality of blocks in which the unit blocks are connected in the same manner but the numbers of unit blocks constituting the blocks are different.

The block detection unit may output the shape of the block, the number of unit blocks constituting the block, and the present position information of the block, which are associated with each other, for each of the blocks included in the Hough space image.

The information processing apparatus may further include a binary conversion unit for converting the Hough space image into binary values based on the number of votes in the Hough space image, and generating the Hough space binary image which is a Hough space image converted into binary values. When the number of votes is equal to or more than a predetermined threshold value, the binary conversion unit may determine that a vote is cast for a corresponding portion, when the number of votes is less than the predetermined threshold value, the binary conversion unit may determine that a vote is not cast for the corresponding portion, and the block detection unit may detect the block on the Hough space binary image.

The block detection unit may detect the plurality of blocks in which the unit blocks are connected in the same manner, in descending order of the number of unit blocks constituting the block.

The block detection unit may change, according to the shape of the block, a position from which detection processing starts as to whether the Hough space image includes the block or not.

According to an embodiment of the present invention, there is provided a block detection method including the steps of executing Hough transformation on a biometrics image which is image information unique to a living body, and detecting whether a block having a predetermined shape is included in a Hough space image which is a Hough-transformed biometrics image, and outputting present position information representing a position at which the block is located in the Hough space image when the block is determined to be included in the Hough space image.

According to an embodiment of the present invention, there is provided a program for causing a computer to achieve a Hough transform function for executing Hough transformation on a biometrics image which is image information unique to a living body, and a block detection function for detecting whether a block having a predetermined shape is included in a Hough space image which is a Hough-transformed biometrics image, and outputting present position information representing a position at which the block is located in the Hough space image when the block is determined to be included in the Hough space image.

SUMMARY OF THE INVENTION

As described above, the information processing apparatus according to an embodiment of the present invention detects whether a block having a predetermined shape is included in a Hough space image, and outputs present position information of the block included in the Hough space image. This corresponds to encoding of the Hough space image based on the block. Therefore, by using the present position informa-

BRIEF DESCRIPTION OF THE DRAWINGS

FIG. 11 is an explanatory diagram illustrating an example of encoded data of a Hough space binary image according to the embodiment;

FIG. 12 is an explanatory diagram illustrating an example of encoded data of a Hough space binary image according to the embodiment;

DETAILED DESCRIPTION OF THE EMBODIMENTS

Figure 1:
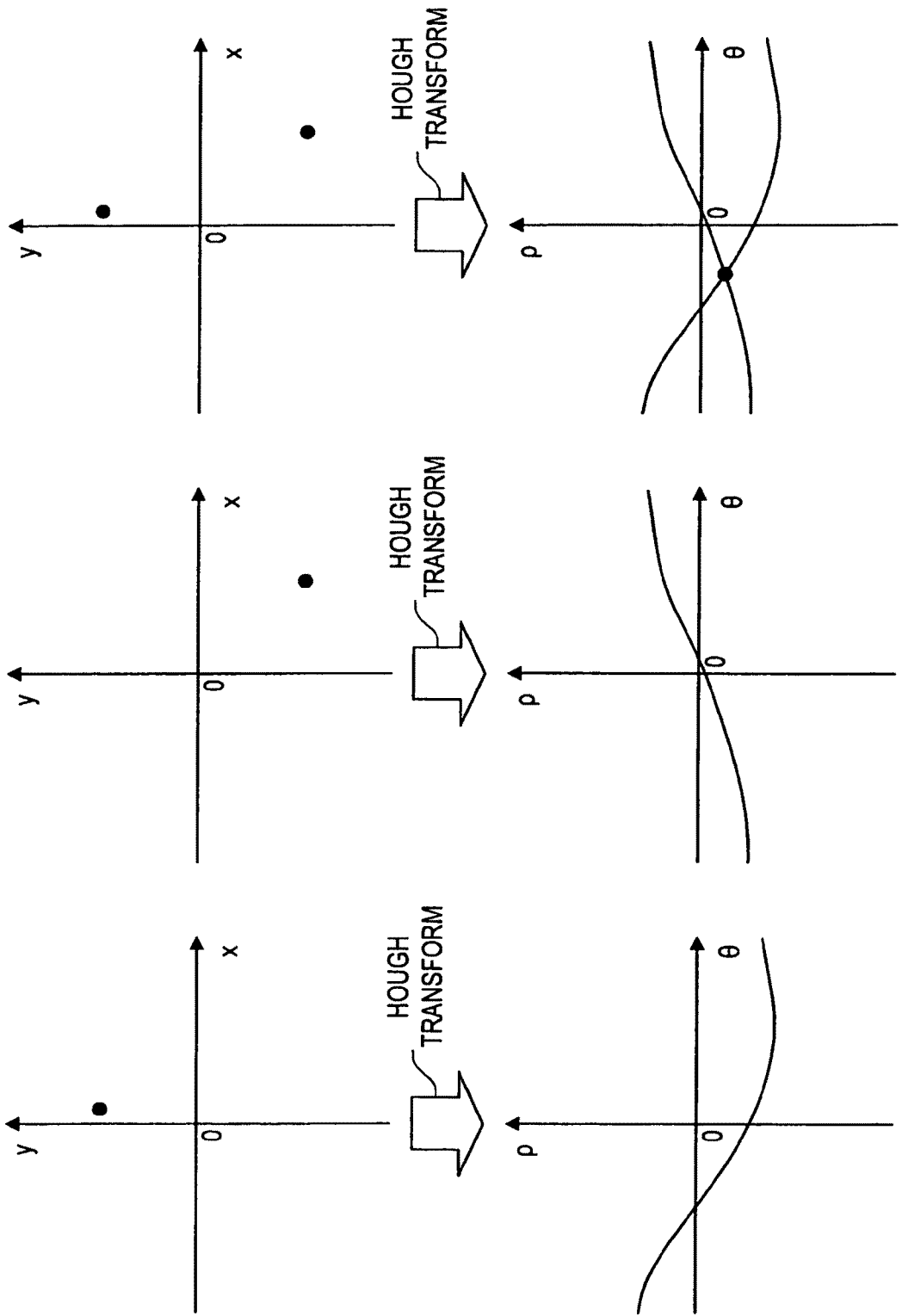
FIG. 1 is an explanatory diagram illustrating Hough transformation.

Hereinafter, preferred embodiments of the present invention will be described in detail with reference to the appended drawings. Note that, in this specification and the appended drawings, structural elements that have substantially the same function and structure are denoted with the same reference numerals, and repeated description of these structural elements is omitted.

The description will be made in the following order.
(1) Regarding Hough transformation
(2) First Embodiment
(2-1) Configuration of information processing apparatus
(2-2) Regarding block detection method
(2-3) Modification of information processing apparatus
(3) Hardware configuration of information processing apparatus according to the embodiment of the present invention
(4) Summary (Regarding Hough Transformation)

Figure 2:
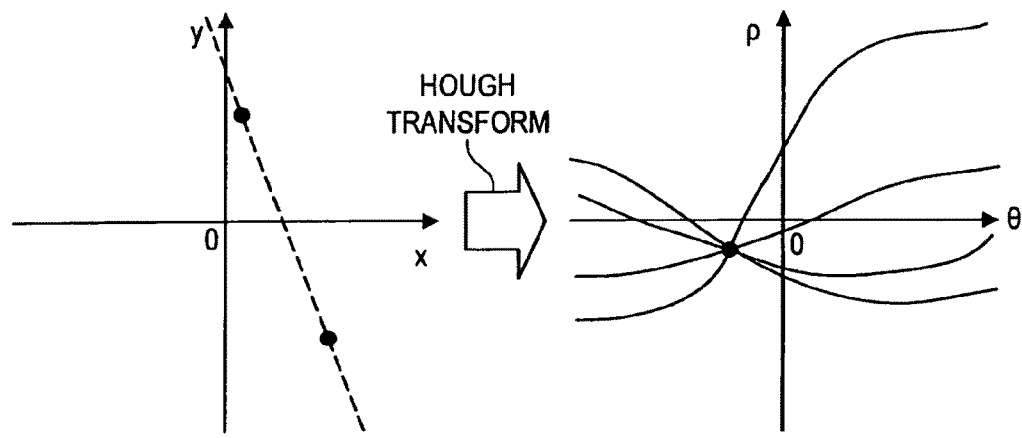
FIG. 2 is an explanatory diagram illustrating Hough transformation.
Figure 3:
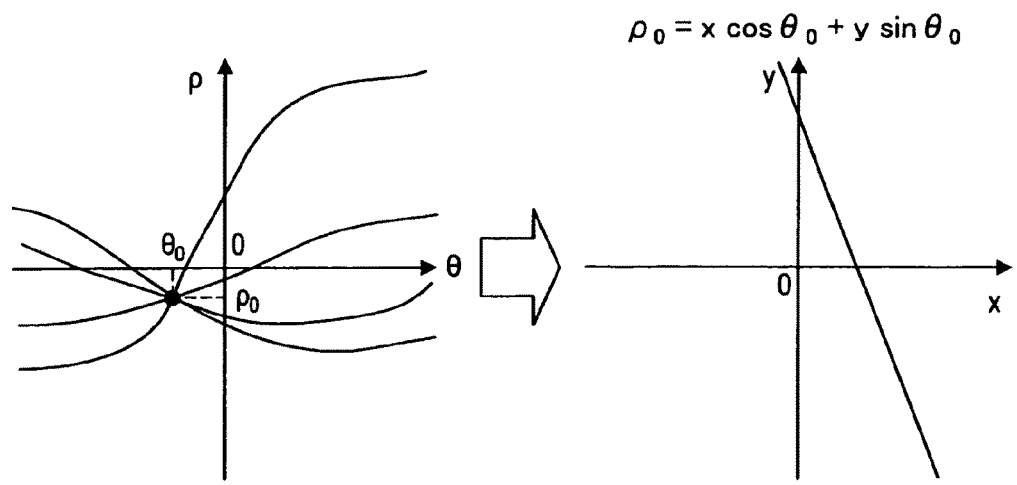
FIG. 3 is an explanatory diagram illustrating Hough transformation.

First, the Hough transformation will be described in detail with reference to FIG. 1 to FIG. 3, before describing an information processing apparatus and a block detection method according to the embodiment of the present invention. FIG. 1 to FIG. 3 are explanatory diagrams illustrating the Hough transformation.

The Hough transformation is a transformation of a given point $(x_0, y_0)$ in an xy-space into a curved line in $\rho\theta$ space (hereinafter referred to as "Hough space") using the following expression 1.

$$\rho = x_0 \cdot \cos\theta + y_0 \cdot \sin\theta \quad \text{(Expression 1)}$$

As is evident from the expression 1, the curved line represented by the expression 1 is a sine wave in the Hough space. Since a coordinate in the xy-space is used as coefficients of circular functions in Expression 1, two points having different coordinates in the xy-space prior to the transformation are represented as two curved lines being different from each other in the Hough space as shown in the graphs on the left and in the center of FIG. 1. As shown in the graph on the right of FIG. 1, more points in the xy-space result in more curved lines in the Hough space, and in some cases, a plurality of curved lines may intersect with each other in proximity to the pole.

For example, as shown in FIG. 2, when points arranged on a line connecting two given points in the xy-space are transformed by the Hough transformation, multiple curved lines intersect with each other on the same point in the Hough space. In other words, when multiple curved lines intersect with each other in the Hough space, a higher degree of intersection (i.e., the number of intersecting curved lines, which is hereinafter referred to as "the number of votes") means that there are more points on the line in the xy-space corresponding to that intersecting point in the Hough space. Accordingly, the line in the xy-space can be predicted by finding a point having a large number of votes in the image of the Hough space and using the coordinate of the found point.

For example, as shown in FIG. 3, when many curved lines intersect with each other at a point $(\theta_0, \rho_0)$ in the Hough space, a formula representing a line in the xy-space can be obtained by substituting the coordinate of this intersecting point into an expression 1. As is evident from a changed formula shown below, the corresponding line in the xy-space has a gradient of $(-\tan^{-1}\theta_0)$ and a y intercept of $(\rho_0 \sin^{-1}\theta_0)$.

$$\rho_0 = x\cos\theta_0 + y\sin\theta_0 \quad \text{[Expression 1]}$$
$$y\sin\theta_0 = -x\cos\theta_0 + \rho_0$$
$$y = -x \cdot \frac{\cos\theta_0}{\sin\theta_0} + \frac{\rho_0}{\sin\theta_0}$$
$$= (-\tan^{-1}\theta_0) \cdot x + \rho_0\sin^{-1}\theta_0$$

The information processing apparatus according to the embodiment of the present invention can perform below-described block detection processing on a biometrics image unique to a living body transformed to the Hough space by the Hough transformation having the above-described features, and can encode the biometrics image to which the Hough transformation has been applied.

First Embodiment

<Configuration of Information Processing Apparatus>

Figure 4:
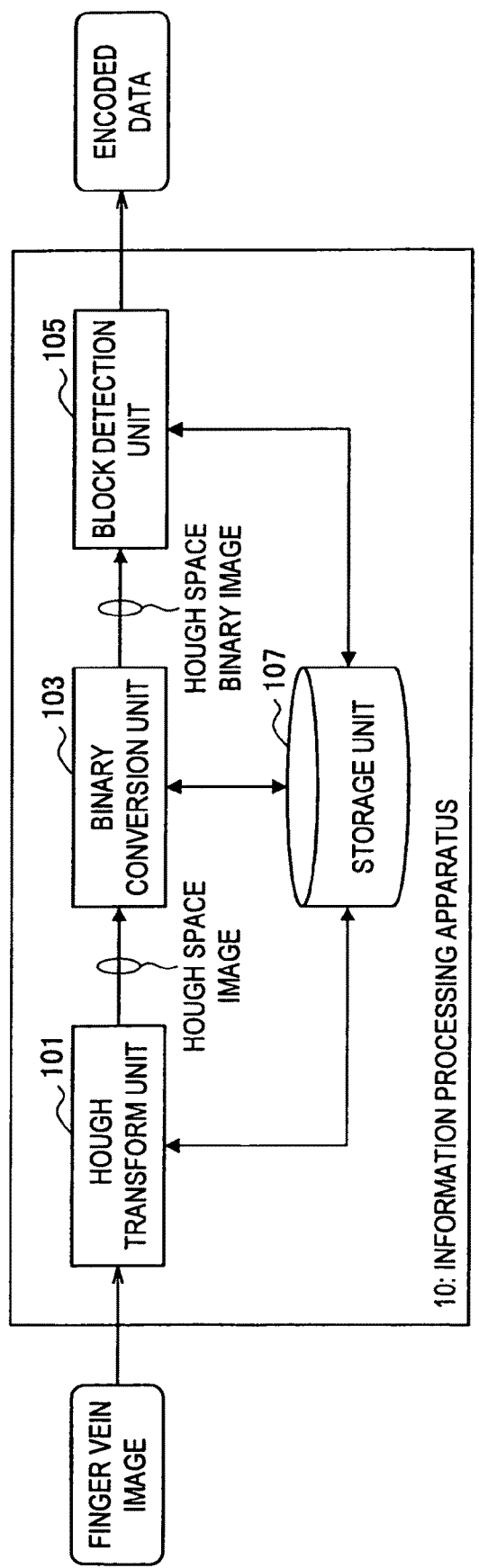
FIG. 4 is a block diagram illustrating a configuration of an information processing apparatus according to a first embodiment of the present invention.
Figure 5:
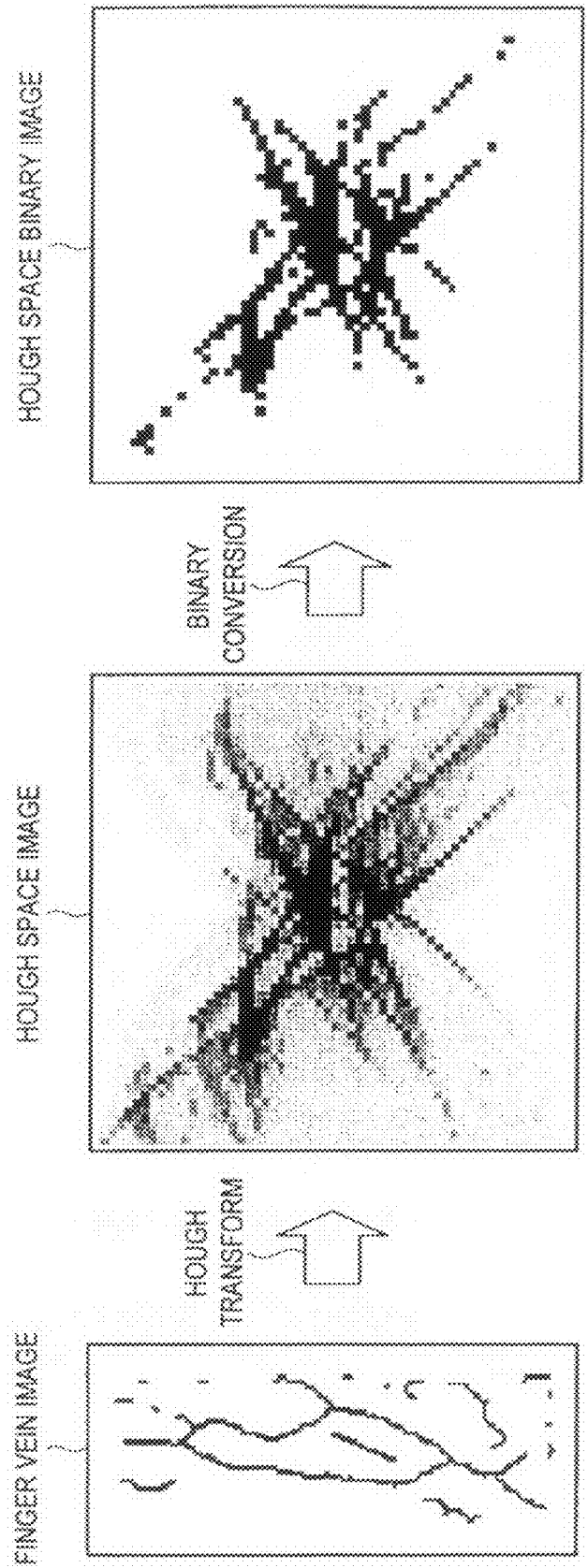
FIG. 5 is an explanatory diagram illustrating the information processing apparatus according to the embodiment.
Figure 6:
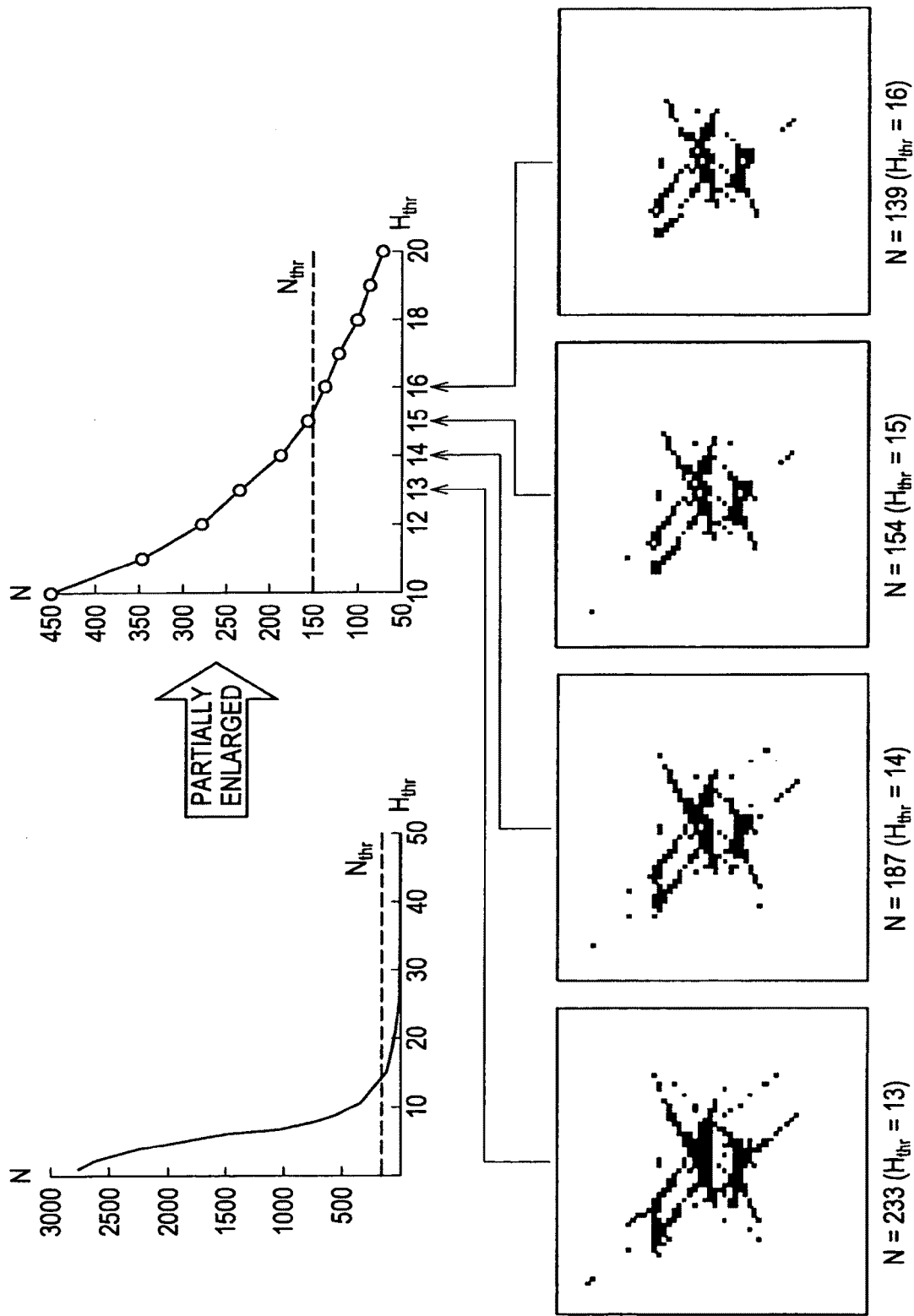
FIG. 6 is an explanatory diagram illustrating a binary conversion unit according to the embodiment.
Figure 13:
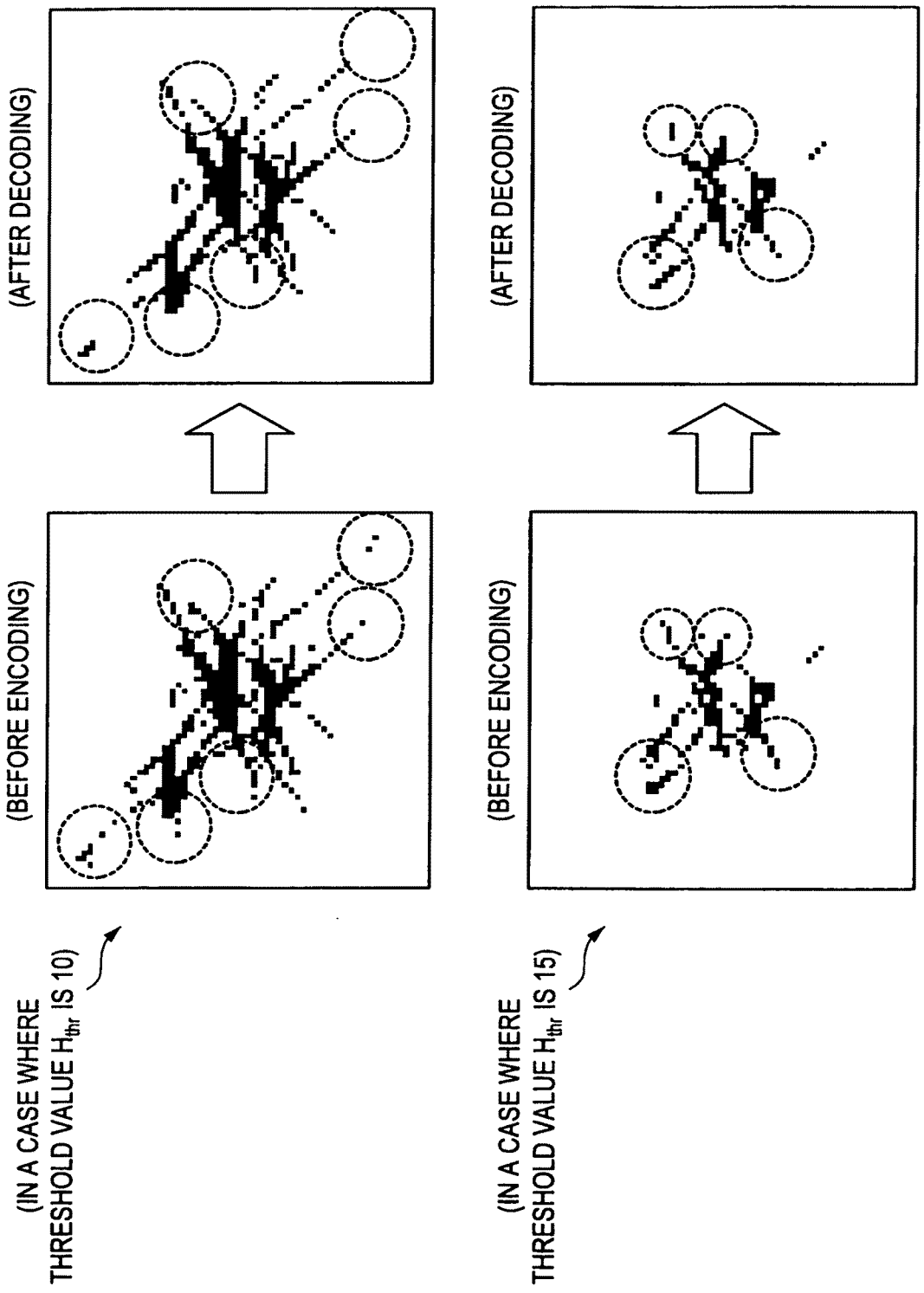
FIG. 13 is an explanatory diagram illustrating an encoded image according to the embodiment.

Subsequently, the configuration of the information processing apparatus according to the first embodiment of the present invention will be described in detail with reference to FIG. 4 to FIG. 13. FIG. 4 is a block diagram illustrating the configuration of the information processing apparatus according to the present embodiment. FIG. 5 is an explanatory diagram illustrating the information processing apparatus according to the present embodiment. FIG. 6 is an explanatory diagram illustrating a binary conversion unit according to the present embodiment. FIG. 7 to FIG. 10 are explanatory diagrams illustrating a block detection unit according to the present embodiment. FIG. 11 and FIG. 12 are explanatory diagrams illustrating an example of encoded data of a Hough space binary image according to the present embodiment. FIG. 13 is an explanatory diagram illustrating encoded image according to the present embodiment.

In the following description, a finger vein image obtained by picking up an image of a finger vein is used as an example of a biometrics image unique to a living body. However, the present invention is not limited to a finger vein image. The present invention can be applied to any image as long as the image includes a linear component extending in a longitudinal direction of the image.

For example, as shown in FIG. 4, the information processing apparatus 10 according to the present embodiment mainly includes a Hough transform unit 101, a binary conversion unit 103, a block detection unit 105, and a storage unit 107.

The Hough transform unit 101 is achieved with, for example, a CPU (Central Processing Unit), a ROM (Read Only Memory), a RAM (Random Access Memory), and the like. The Hough transform unit 101 executes the Hough transformation on a received biometrics image (for example, a finger vein image), and generates a Hough space image, i.e., a Hough-transformed biometrics image.

For example, as shown on the left side of FIG. 5, the received finger vein image is an image in which sections corresponding to finger veins are represented by line segments. For example, this finger vein image may be a binary image in which a pixel corresponding to a finger vein is represented by data "1" and a pixel other than the finger veins is represented by data "0". The Hough transform unit 101 uses the above expression 1 to apply the Hough transformation to coordinates of pixels corresponding to finger veins in the received finger vein image, thus obtaining a Hough space image, for example, as shown in the center of FIG. 5.

The Hough transform unit 101 cast votes for coordinates on curved lines in the Hough space that correspond to respective coordinates (x, y) of the finger vein sections in the finger vein image. As a result, in the generated Hough space image, the number of votes at an intersecting point at which multiple curved lines intersect with each other is a large value. Therefore, the Hough space image generated by the Hough transform unit 101 shows the magnitude of the number of votes at each pixel constituting the Hough space image. For example, in the Hough space image shown in the center of FIG. 5, a pixel having a larger number of votes is represented by a darker color.

The Hough transform unit 101 transmits the generated Hough space image to the later-described binary conversion unit 103. Further, the Hough transform unit 101 may store the generated Hough space image to the later-described storage unit 107 and the like.

The binary conversion unit 103 is achieved with, for example, a CPU, a ROM, a RAM, and the like. The binary conversion unit 103 converts the Hough space image transmitted from the Hough transform unit 101 into binary values based on the numbers of votes in the Hough space image, thus generating a Hough space image having been converted into binary values, i.e, a Hough space binary image.

Before performing later-described binary conversion processing, the binary conversion unit 103 discretizes the parameters $\rho$, $\theta$ with predetermined magnitudes ($\Delta\rho$, $\Delta\theta$), respectively, and accordingly counts the numbers of votes in such manner that all of coordinates of the intersecting points residing within a rectangular range of $\Delta\rho \times \Delta\theta$ are treated as the same intersecting point. By discretizing the parameters, the number of data points (i.e., coordinates in the Hough space) for which the numbers of votes are stored can be reduced.

For example, where the Hough space image has $\rho$ and $\theta$ in the ranges of $-60 \leq \rho \leq 60$, $-90 \leq \theta \leq 90$, and it is assumed that $\Delta\rho=2$, $\Delta\theta=3$, the Hough space image includes $60 \times 60 = 3600$ pixels, which is equivalent to the amount of data of about 450 bytes.

The binary conversion unit 103 converts the Hough space image into binary values, based on the number of votes at each discretized coordinate and based on a threshold value determined by the below-described method. It should be noted that too many or too few pixels remaining as intersecting points as a result of binary conversion of the Hough space image would lead to an issue in calculating the degree of similarity during biometrics authentication processing. In other words, there is a possibility that two different Hough space images may be incorrectly determined to be the same Hough space image. Therefore, the binary conversion unit 103 according to the present embodiment carries out the below-described method to determine a threshold value of the number of votes that is used when the binary conversion processing is performed.

The method for determining the threshold value of the number of votes will be described with reference to FIG. 6.

A graph shown on the left side of FIG. 6 shows relationship between a threshold value $H_{thr}$ of the number of votes and the number of pixels N having the number of votes equal to or more than this threshold value $H_{thr}$. It should be noted that the Hough space image corresponding to the graph shown in FIG. 6 includes 60 vertical pixels and 60 horizontal pixels, which amount to 3600 pixels.

As is evident from the graph shown on the left side of FIG. 6, as the threshold value $H_{thr}$ of the number of votes increases, the number of pixels remaining after the binary conversion processing (i.e., pixels having the number of votes equal to or more than the threshold value $H_{thr}$) decreases. Accordingly, the binary conversion unit 103 uses a threshold value $N_{thr}$ relating to the number of remaining pixels (pixels having the number of votes equal to or more than the threshold value) to determine a threshold value $H_{thr}$ of the number of votes used for the binary conversion processing.

The threshold value $N_{thr}$ relating to the number of remaining pixels is determined so that the Hough space image of the user can be distinguished from the Hough space image of another person. This threshold value $N_{thr}$ is a parameter affecting a False Rejection Rate (FRR), a False Acceptance Rate (FAR), and the like of a biometrics authentication system using a biometrics image to which the Hough transformation has been applied. Therefore, the threshold value $N_{thr}$ relating to the number of remaining pixels is set to an appropriate value in advance based on, e.g., data obtained by statistically processing actual authentication processing result.

First, the binary conversion unit 103 converts the Hough space image, which is subjected to the binary conversion processing, into binary values based on such a threshold value $H_{thr}^0$ that makes relatively many remaining pixels (in other words, a small threshold value), and determines the number of remaining pixels $N_0$. In a case where the remaining pixels are more than the predetermined threshold value $N_{thr}$ ($N_0 > N_{thr}$), the binary conversion unit 103 increases the threshold value $H_{thr}^0$ by a predetermined increment $\Delta H_{thr}$, and sets a new threshold value $H_{thr}^1$ ($H_{thr}^1 = H_{thr}^0 + \Delta H_{thr}$). Subsequently, the binary conversion unit 103 uses $H_{thr}^1$ to perform the binary conversion processing again on the Hough space image, and determines the number of remaining pixels $N_1$. The above processing is repeated for (q+1) times to determine the number of remaining pixels $N_q$ at the time of the (q+1)th processing. When $N_q < N_{thr}$ is satisfied, the binary conversion unit 103 determines that the number of remaining pixels has converged. Subsequently, the binary conversion unit 103 adopts the threshold value $H_{thr}{}^q$ of the previous processing as the threshold value for the binary conversion processing, and adopts the image having the number of remaining pixels $N_{q-1}$ at the threshold value $H_{thr}{}^q$ as the Hough space binary image, i.e., the Hough space image converted into binary values.

The above processing will be described more specifically with reference to the specific examples shown in FIG. 6.

FIG. 6 shows a case where $N_{thr}=150$. When $H_{thr}=13$, the number of remaining pixels N is 233 as shown in the figure, which is a value larger than the threshold value $N_{thr}$. Accordingly, the binary conversion unit 103 increases the threshold value $H_{thr}$ by one. Then, the binary conversion processing is performed again with the threshold value $H_{thr}=14$. When the threshold value $H_{thr}=14$, the number of remaining pixels N is 187, which is a value larger than the threshold value $N_{thr}$. Accordingly, the binary conversion unit 103 further increases threshold value $H_{thr}$ by one. Then, the binary conversion processing is performed with the threshold value $H_{thr}=15$. When the threshold value $H_{thr}=15$, the number of remaining pixels N is 154, which is a value larger than the threshold value $N_{thr}$. Accordingly, the binary conversion unit 103 further increases the threshold value $H_{thr}$ by one. Then, the binary conversion processing is performed again with the threshold value $H_{thr}=16$. When the threshold value $H_{thr}=16$, the number of remaining pixels N is 139, which is a value smaller than the threshold value $N_{thr}$. Accordingly, the binary conversion unit 103 adopts the previous threshold value $H_{thr}=15$ as the threshold value for the binary conversion processing.

The binary conversion unit 103 uses the thus determined threshold value $H_{thr}$ to perform the binary conversion processing of the Hough space image. When the number of votes of the corresponding pixel (coordinate) is equal to or more than the threshold value $H_{thr}$, the binary conversion unit 103 determines that a vote is cast for the corresponding pixel. When the number of votes of the corresponding pixel (coordinate) is less than the threshold value $H_{thr}$, the binary conversion unit 103 determines that a vote is not cast for the corresponding pixel. By performing the above processing, the binary conversion unit 103 can convert the Hough space image into binary values to generate the Hough space binary image, i.e., a binary image. For example, the Hough space image shown in the center of FIG. 5 is converted by the binary conversion unit 103 into binary values using the appropriate threshold value $H_{thr}$. As a result, the Hough space binary image, i.e., a binary image, is obtained as shown on the right side of FIG. 5.

The Hough space image is converted into binary values by performing the above processing. Therefore, it is not necessary to store the number of votes at each pixel of the Hough space image in detail, and the data capacity of the Hough space image can be reduced.

The binary conversion unit 103 transmits the generated Hough space binary image to the later-described block detection unit 105. Further, the binary conversion unit 103 may store the generated Hough space binary image to the later-described storage unit 107 and the like.

The block detection unit 105 is achieved with, for example, a CPU, a ROM, a RAM, and the like. The block detection unit 105 detects whether a block having a predetermined shape is included in the Hough-transformed biometrics image (for example, the Hough space binary image). In addition, when the blocks are determined to be included in the Hough-transformed biometrics image, the block detection unit 105 outputs present position information representing a position at which the block is present in the Hough-transformed biometrics image. Hereinafter, block detection processing performed by the block detection unit 105 will be described in detail.

As is evident from FIG. 5, the image in the Hough space is a set of sine waves (sine function curved lines). Accordingly, in the Hough space binary image, a horizontal line in which pixels are aligned in a horizontal direction and a vertical line in which pixels are aligned in a vertical direction are less likely to be prominent. However, there are many sets of pixels diagonally connected and rectangular regions formed by multiple gathered pixels. Therefore, the block detection unit 105 according to the present embodiment uses, for example, blocks as shown in FIG. 7, to determine where the blocks are located in the Hough space binary image and how many blocks are present in the Hough space binary image.

First, the blocks used by the block detection unit 105 for the block detection processing will be described.

Figure 7:
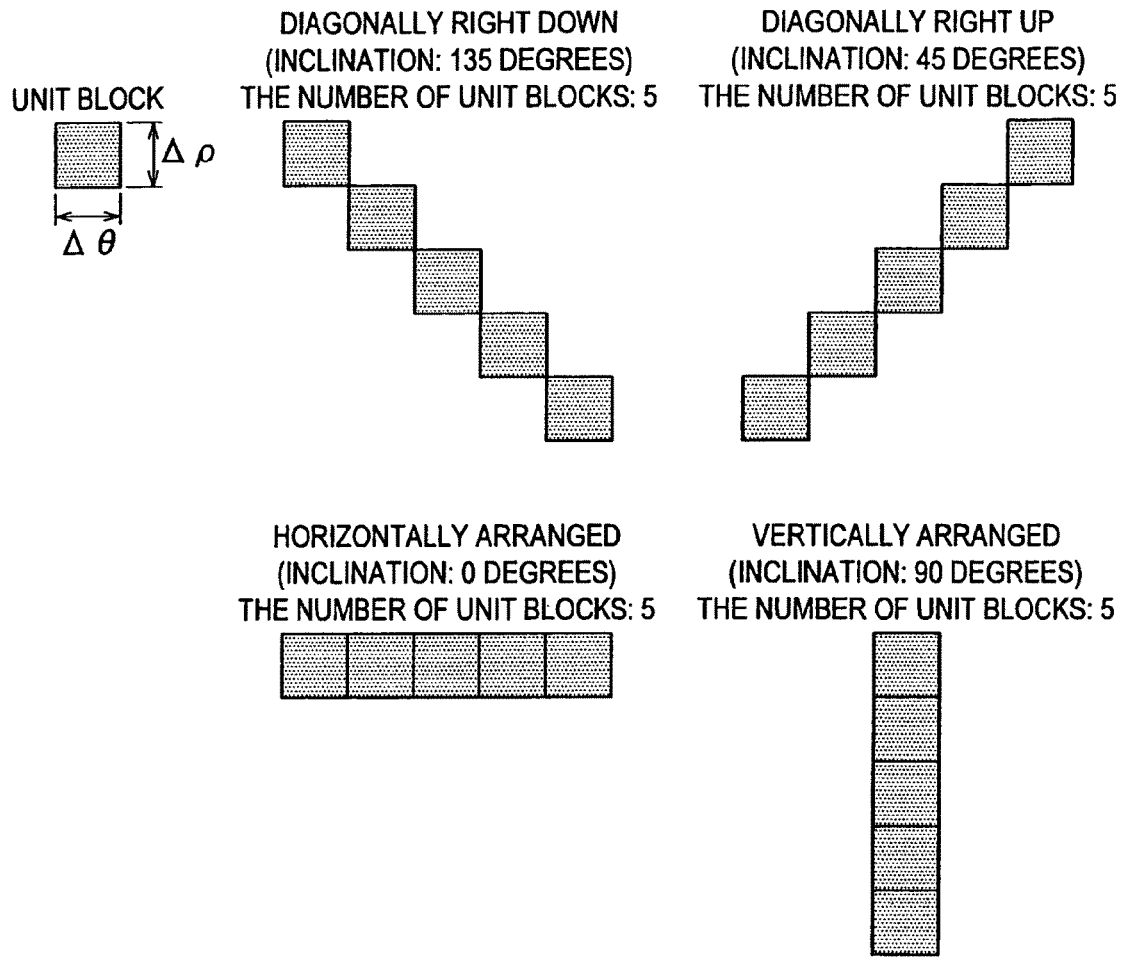
FIG. 7 is an explanatory diagram illustrating a block detection unit according to the embodiment.

For example, as shown in FIG. 7, the block used by the block detection unit 105 for the block detection processing is constituted by one or multiple unit blocks. It is preferable for the unit block to have the same size as the size of the unit pixel constituting the Hough space binary image. When the pixels constituting the Hough space binary image are discretized by $\Delta\rho \times \Delta\theta$, the size of the unit block is $\Delta\rho \times \Delta\theta$ as shown in FIG. 7.

For example, as shown in FIG. 7, various blocks used in the block detection processing are made by connecting multiple unit blocks so as to have a predetermined inclination. Alternatively, the block used in the block detection processing may include the unit block itself. For example, as shown in FIG. 7, the block detection unit 105 uses multiple kinds of blocks in which the unit blocks are connected in different manners.

As shown in FIG. 7, examples of such blocks include four types of blocks, in which the unit blocks are connected differently, such as diagonally right down arrangement, diagonally right up arrangement, horizontal arrangement, and vertical arrangement. As shown in FIG. 7, the blocks arranged diagonally right down are blocks arranged such that the lower right corner of a certain unit block is connected with the upper left corner of a unit block adjacent to this unit block. As shown in FIG. 7, the blocks arranged diagonally right up are blocks arranged such that the upper right corner of a certain unit block is connected with the lower left corner of a unit block adjacent to this unit block. As shown in FIG. 7, the horizontally arranged blocks are blocks arranged such that the right side of a certain unit block is connected with the left side of a unit block adjacent to this unit block. As shown in FIG. 7, the vertically arranged blocks are blocks arranged such that the lower side of a certain unit block is connected with the upper side of a unit block adjacent to this unit block.

In the following description, the inclination of the horizontally arranged blocks is represented as zero degrees. Based on the inclination of the horizontally arranged blocks, the inclination of the blocks arranged diagonally right up is represented as 45 degrees, the inclination of the vertically arranged blocks is represented as 90 degrees, and the inclination of the blocks arranged diagonally right down is represented as 135 degrees.

In FIG. 7, all of the four kinds of blocks are represented as blocks made by connecting five unit blocks. However, the block detection unit 105 does not necessarily use the blocks having the sizes as shown in FIG. 7. In other words, the block detection unit 15 may perform block detection processing using multiple blocks which are connected in the same manner but have different numbers of unit blocks. The number of unit blocks constituting a block is at least two or more. The number of unit blocks constituting the blocks arranged diagonally right down and the blocks arranged diagonally right up can be set to a number up to the number of pixels located on a diagonal line of the Hough space binary image. The number of unit blocks constituting the horizontally arranged blocks can be set to a number up to the number of pixels arranged in a horizontal direction of the Hough space binary image. The number of unit blocks constituting the vertically arranged blocks can be set to a number up to the number of pixels arranged in a height direction of the Hough space binary image.

For each of the blocks arranged in diagonally right down arrangement, diagonally right up arrangement, horizontal arrangement, and vertical arrangement, the block detection unit 105 performs the block detection processing while changing the number of unit blocks constituting the block from the maximum number of unit blocks to the minimum number of unit blocks defined in advance. At this occasion, the maximum number of unit blocks may not necessarily be the maximum value determined by the size of the Hough space binary image. On the other hand, the minimum number of unit blocks may not be necessarily set to "2". As described later, the block detection processing is processing for encoding the Hough space binary image, and the time for the block detection processing and the degree of encoding depend on this minimum number of unit blocks and the maximum number of unit blocks. Therefore, the minimum number of unit blocks and the maximum number of unit blocks are set appropriately according to the time allowed for the block detection processing and the degree of encoding needed.

Herein, when the block detection unit 105 performs the block detection processing on a certain block while changing the number of unit blocks, the number of unit blocks constituting a block is preferably changed from the maximum number of unit blocks to the minimum number of unit blocks. By changing the number of unit blocks constituting a block from a large value to a small value, the block detection unit 105 can detect a longer block from the Hough space binary image, thus efficiently performing encoding operation.

As described above, the Hough space binary image includes more diagonally-connected pixels than pixels connected in the horizontal direction and pixels connected in the vertical direction. Accordingly, the block detection unit 105 preferably performs the detection processing using the blocks arranged diagonally right down and the blocks arranged diagonally right up, before performing the detection processing using the horizontally arranged blocks and the vertically arranged blocks. By performing the block detection in the above order, the block detection unit 105 reduces the possibility of performing inefficient processing, i.e., encoding many pixels extending in a diagonal direction using the vertically arranged blocks and the horizontally arranged blocks. Therefore, the block detection unit 105 can efficiently encode the Hough space binary image.

Figure 8:
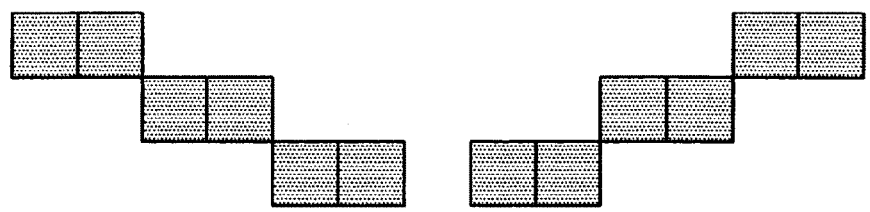
FIG. 8 is an explanatory diagram illustrating a block detection unit according to the embodiment.

It should be noted that the shape of the blocks used by the block detection unit 105 for the block detection processing is not limited to four types as shown in FIG. 7. The block detection unit 105 may use only two types, i.e., diagonally right down arrangement and diagonally right up arrangement, for the block detection processing. Further, the block detection unit 105 can use not only the blocks having the shapes as shown in FIG. 7 but also blocks corresponding to shapes frequently appearing in the Hough space binary image. For example, a block as shown in FIG. 8 may be used.

Subsequently, the search direction of image during detection processing of blocks will be described with reference to FIG. 9.

When the block detection unit 105 detects each block included in the Hough space binary image, it is preferable for the block detection unit 105 to change the position from which detection starts (hereinafter referred to as "detection start point") and the direction in which the Hough space binary image is searched, according to the type of block used for detection.

Figure 9:
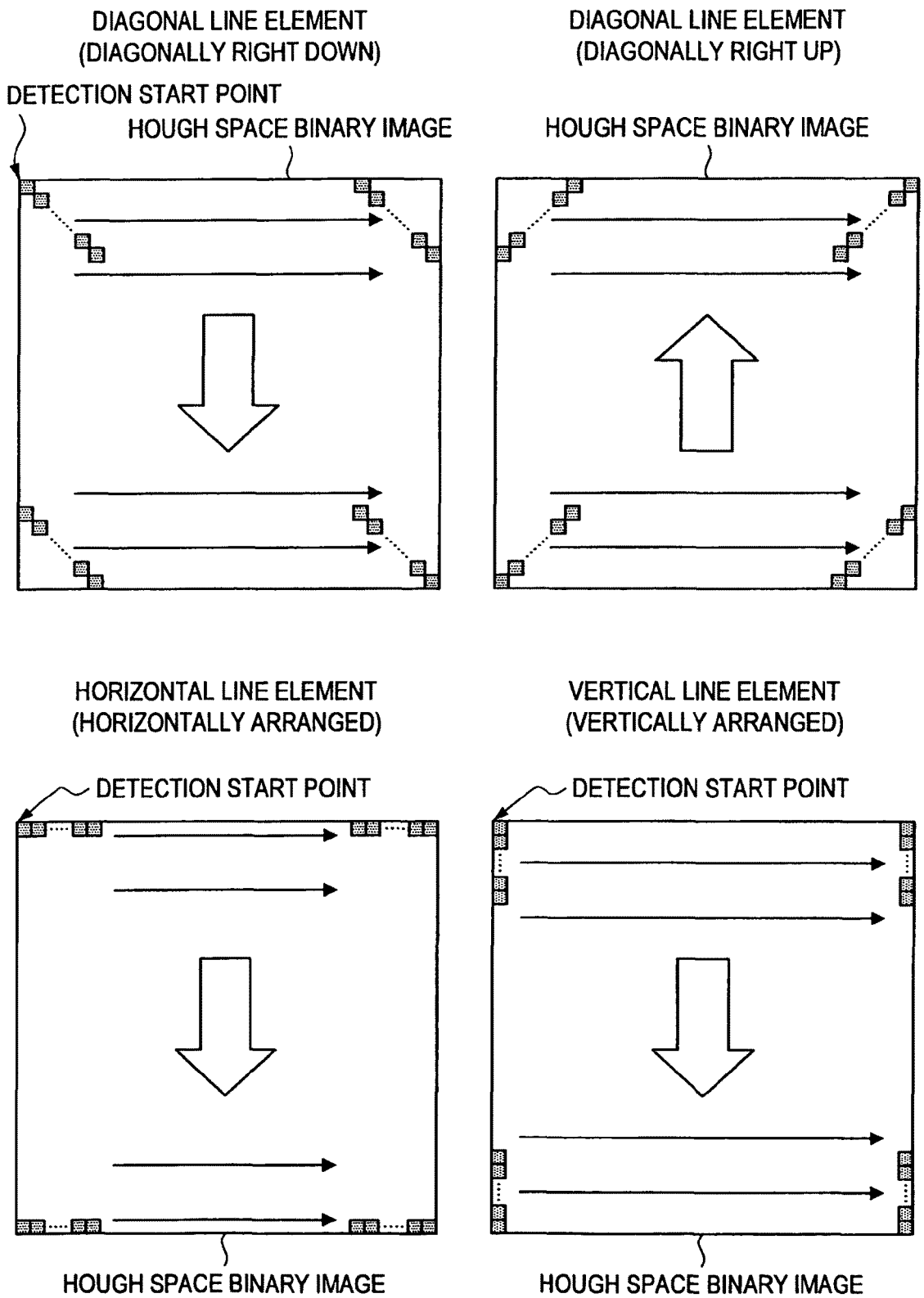
FIG. 9 is an explanatory diagram illustrating a block detection unit according to the embodiment.

For example, as shown in the upper left figure in FIG. 9, when the blocks arranged diagonally right down are used to execute the block detection processing, the block detection unit 105 adopts the upper left end of the Hough space binary image as the detection start point. Then, the block detection unit 105 uses the blocks arranged diagonally right down to execute the block detection processing from the upper left end to the lower right end. As shown in the lower left figure and the lower right figure in FIG. 9, when the horizontally arranged blocks and the vertically arranged blocks are used to execute the block detection processing, the block detection unit 105 adopts the upper left end of the Hough space binary image as the detection start point, and executes the block detection processing from the upper left end to the lower right end.

As shown in the upper right figure in FIG. 9, when the blocks arranged diagonally right up are used to execute the block detection processing, the block detection unit 105 adopts the lower left end of the Hough space binary image as the detection start point. Then, the block detection unit 105 uses the blocks arranged diagonally right up to execute the block detection processing from the lower left end to the upper right end.

As described above, the block detection unit 105 adopts a position appropriate for detection processing using respective blocks as a detection start point, and performs the detection processing of blocks in a search direction appropriate for the respective blocks. As a result, the block detection unit 105 can detect a longer block from the Hough space binary image, and can efficiently perform encoding processing.

The block detection unit 105 uses the blocks shown in FIG. 7 to search the Hough space binary image, and determines whether the Hough space binary image includes any section corresponding to the blocks used for detection. When the Hough space binary image is determined to include a section corresponding to the blocks used for detection, the block detection unit 105 outputs information representing the shape of the detected blocks, the number of unit blocks constituting the blocks, and present position information representing the position at which the blocks are present, which are associated with each other. Thereafter, the block detection unit 105 deletes the section corresponding to the detected blocks from the Hough space binary image, and continues the detection processing of blocks. When the search of all the blocks in the range of the number of unit blocks defined in advance has been finished, the block detection unit 105 finishes the detection processing of blocks.

Figure 10:
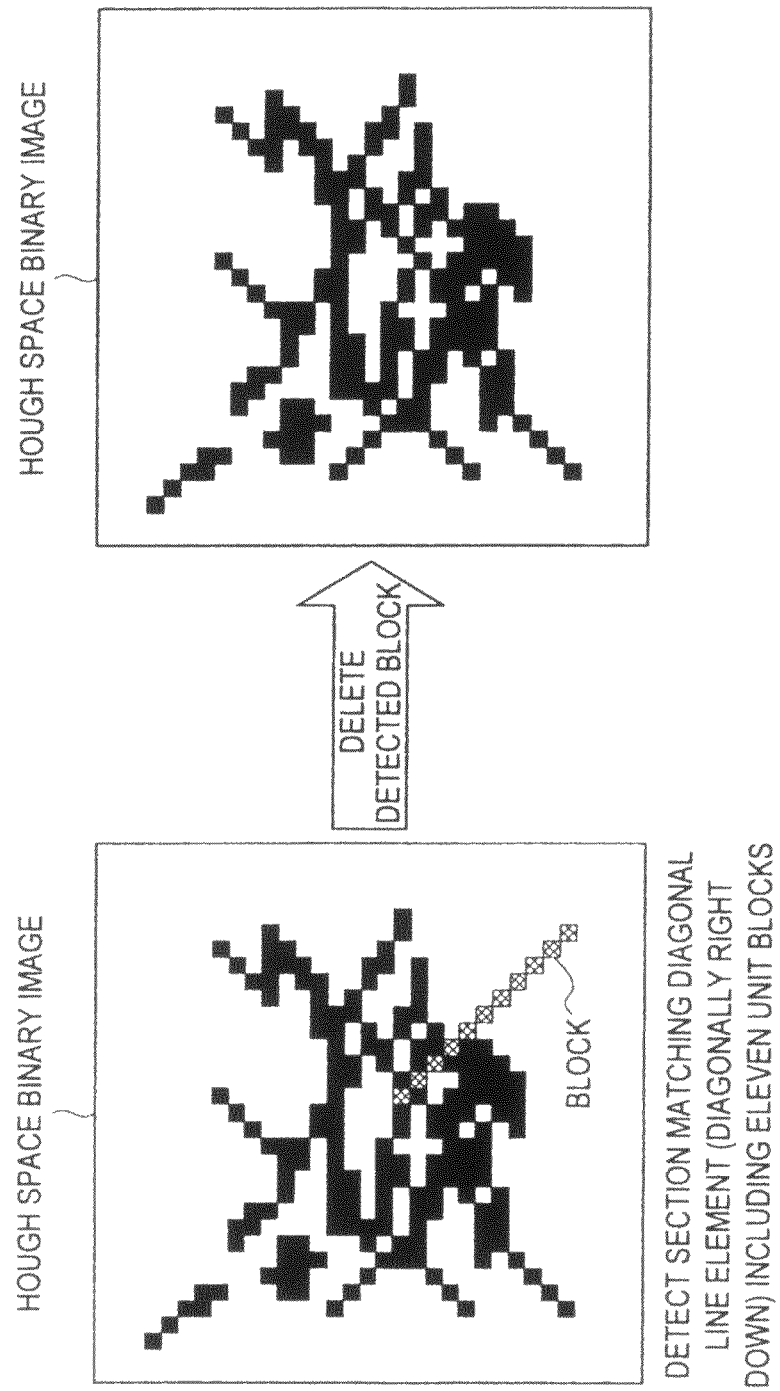
FIG. 10 is an explanatory diagram illustrating a block detection unit according to the embodiment.

For example, as shown in FIG. 10, it is assumed that the block detection unit 105 uses the blocks arranged diagonally right down consisting of eleven unit blocks to perform the detection processing on the Hough space binary image. When the block detection unit 105 detects a section corresponding to the blocks used for detection as shown in FIG. 10, the block detection unit 105 outputs the above-described information, and deletes the detected blocks from the Hough space binary image. This deletion processing of the matched section aims to prevent redundant detection of the already detected section with other blocks. Alternatively, other methods may be used to prevent redundant detection of already detected sections.

Herein, the information representing the shape of blocks is information for identifying the blocks used for detection, and may be the name representing the type of blocks such as "diagonally right down" and "diagonally right up" or numerals representing the inclination of the blocks such as "135°" and "45°". For example, a coordinate representing a position at which a section corresponding to the blocks may be used as the present position information representing the position at which the blocks are present. A coordinate at which a predetermined portion of the blocks used for detection is located may be used as the coordinate of the section corresponding to the blocks. For example, as shown in FIG. 11, the predetermined portion of the blocks may be defined in advance for the respective blocks. In the example shown in FIG. 11, the upper left end of the Hough space binary image is adopted as the origin point (0, 0). In a case of the blocks arranged diagonally right down, the coordinate of the upper left end of the blocks is configured to output. In a case of the blocks arranged diagonally right up, the coordinate of the lower left end of the blocks is configured to output. In a case of the horizontally arranged blocks, the coordinate of the left end of the blocks is configured to output. In a case of the vertically arranged blocks, the coordinate of the upper end of the blocks is configured to output.

For example, as shown in FIG. 12, all the information output by the block detection unit 105 can be made into a table. The table shown in FIG. 12 contains the number of unit blocks and the shape of blocks included in the Hough space binary image and the coordinates at which these blocks are located. The size of the data output by the block detection unit 105 is about 2 bytes per detected block. As shown in FIG. 11, which unit block is chosen to output the coordinate thereof is defined in advance for the detected blocks, so that the Hough space binary image can be drawn again based on the output information. Therefore, the table as shown in FIG. 12 generated based on the information output by the block detection unit 105 is nothing but data generated by encoding the Hough space binary image. In other words, the block detection processing performed by the block detection unit 105 may be called encoding processing of the Hough space binary image.

FIG. 13 illustrates images before encoding and decoded images, which are made by converting the Hough space image including 60×60=3600 pixels into binary values using two kinds of threshold values. When the threshold value $H_{thr}=10$, the number of elements of blocks detected by the block detection unit 105 is 70, and the amount of data is about 140 bytes. When the threshold value $H_{thr}=15$, the number of elements of blocks detected by the block detection unit 105 is 34, and the amount of data is about 68 bytes. Since the amount of data of the Hough space binary image is about 450 bytes, the amount of data is reduced to about 15 to 30& as a result of the above encoding processing.

Herein, FIG. 13 shows an example of execution of block detection processing where the minimum number of unit blocks is 2. Accordingly, a section consisting of only one unit block (i.e., the section of the unit block itself) is not detected by the block detection unit 105. As a result, as shown in sections enclosed by dotted lines in FIG. 13, the sections in which the unit blocks themselves are remaining as a result of the block detection processing are not reproduced in the decoded image.

By further increasing the minimum number of unit blocks to a larger value in the block detection processing, the Hough space binary image can be encoded into a further smaller number of bytes. Alternatively, when the minimum number of unit blocks is set to one, all the pixels are detected from the Hough space binary image, and loss-less encoding of the Hough space binary image can be achieved.

FIG. 4 is referenced again. The storage unit 107 according to the present embodiment will be described.

The storage unit 107 may store various parameters or progress of processing that are necessary to be stored while the information processing apparatus 10 according to the present embodiment performs certain processing, and may store various kinds of databases and the like as necessary. The storage unit 107 can be freely read and written by the Hough transform unit 101, the binary conversion unit 103, the block detection unit 105, and the like.

In the above description, the Hough space image generated by the Hough transform unit 101 is converted into the Hough space binary image by the binary conversion unit 103, and the Hough space binary image is processed by the block detection unit 107. Alternatively, the Hough space image may be processed by the block detection unit 107 without being converted into binary values by the binary conversion unit 103.

An example of the functions of the information processing apparatus 10 according to the present embodiment has been hereinabove described. Each of the above constituent elements may be structured using a general-purpose member and a circuit, or may be structured by hardware dedicated to the function of the respective constituent element. Alternatively, the function of each constituent element may be carried out by a CPU and the like. Therefore, the used configuration may be changed as necessary in accordance with the state of art at the time of carrying out the present embodiment.

It is possible to make a computer program for realizing the functions of the above-described information processing apparatus according to the present embodiment, and the computer program can be implemented on a personal computer and the like. Further, a computer-readable recording medium storing such computer program can be provided. Examples of the recording medium include a magnetic disk, an optical disk, a magneto-optical disk, and a flash memory. Further, the above computer program may be distributed by, for example, a network, without using the recording medium.

<Regarding Block Detection Method>

Figure 14:
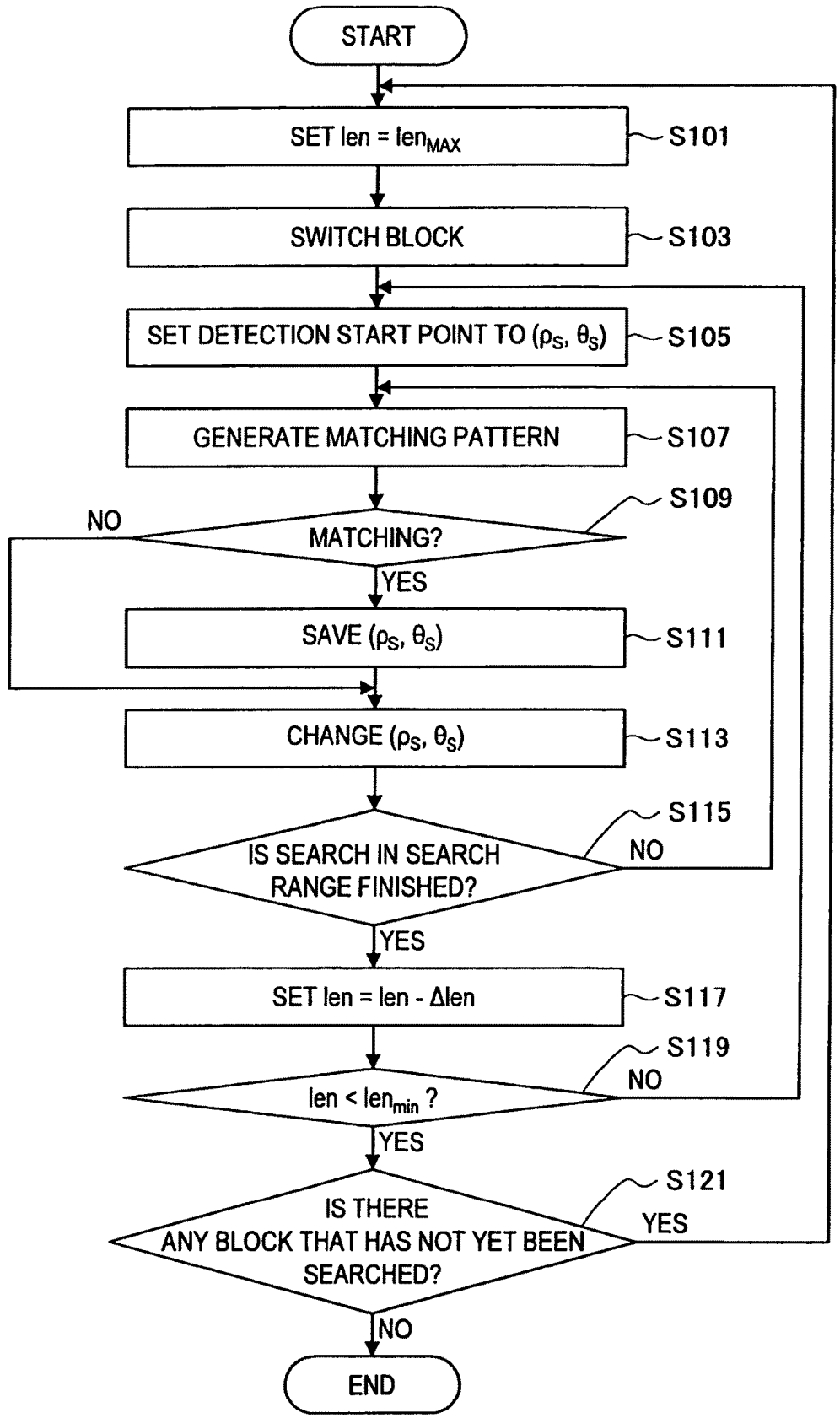
FIG. 14 is a flow diagram illustrating a block detection method according to the embodiment.

Subsequently, the block detection method executed by the block detection unit 105 of the information processing apparatus 10 according to the present embodiment will be described in detail with reference to FIG. 14. FIG. 14 is a flow diagram illustrating the block detection method according to the present embodiment.

Before the processing in the following description, the finger vein image input to the information processing apparatus 10 according to the present embodiment is converted by the Hough transform unit 101 into the Hough space image, and the Hough space image is converted into binary values by the binary conversion unit 103. As a result, the Hough space binary image is generated.

First, the block detection unit 105 sets the maximum number of unit blocks $len_{MAX}$ to a parameter len representing the number of unit blocks (step S101). Subsequently, the block detection unit 105 switches the blocks with which the detection processing is executed (step S103). When the detection processing is performed on the Hough space binary image input to the block detection unit 105 for the first time, the block detection unit 105 preferably switches the blocks to diagonal direction blocks such as diagonally right down arrangement and diagonally right up arrangement, before switching to the horizontally arranged blocks and the vertically arranged blocks.

Subsequently, the block detection unit 105 sets the detection start point, from which the block detection processing starts, to a point $(\rho_s, \theta_s)$ corresponding to the chosen blocks (step S105). Subsequently, the block detection unit 105 uses the number of unit blocks corresponding to the parameter len to generate a matching pattern having the shape of blocks in question (step S107). That is, in a case where, for example, the shape in question is the blocks arranged diagonally right down and the parameter len is 20, then 20 unit blocks are used to generate the blocks arranged diagonally right down.

Subsequently, the block detection unit 105 performs matching determination as to whether pixels are aligned in such a manner to agree with the matching pattern on a line segment having the same inclination and the same length as the matching pattern having the base point at the coordinate $(\rho_x, \theta_s)$ (step S109). That is, for example, in a case where data representing the presence of the number of votes is 1 in the Hough space binary image, a line segment having the same inclination and the same length as the matching pattern having the base point at the coordinate $(\rho_s, \theta_s)$ is considered, and a determination is made as to whether a data value of a pixel located on this line segment is 1 or not.

When the matching pattern is determined to agree with the arrangement of pixels in the Hough space binary image, the block detection unit 105 outputs and saves the coordinate $(\rho_s, \theta_s)$ respectively in association with information representing the shape of the blocks in question and the parameter len (step S111). At this occasion, the block detection unit 105 preferably performs processing for indicating that the pixels present on the corresponding line segment has already been detected (for example, processing for deleting the data of the corresponding pixels from the Hough space binary image). Thereafter, the block detection unit 105 performs step S113, which is described later.

In a case where the arrangement of pixels on the line segment having the base point at the coordinate in question is determined not to agree with the matching pattern or where the coordinate in question has already been output and saved, the block detection unit 105 changes the coordinate $(\rho_s, \theta_s)$ in question (step S113). More specifically, the block detection unit 105 moves the coordinate $(\rho_s, \theta_s)$ in question by $\Delta\rho$ and $\Delta\theta$, respectively, to obtain the coordinate $(\rho_s+\Delta\rho, \theta_s+\Delta\theta)$. Herein, for example, each of $\Delta\rho$ and $\Delta\theta$ is preferably 1.

Subsequently, the block detection unit 105 compares the changed coordinate with the size of the Hough space binary image in question, so as to determine whether the block detection processing has been performed on the entire search range (step S115). When the block detection processing has not yet been performed on the entire search range, the block detection unit 105 returns back to step S107 to repeat the detection processing of blocks. Alternatively, when the block detection processing has been performed on the entire search range, the block detection unit 105 sets the value of the parameter len to (len−Δlen) (step S117). Herein, for example, Δlen is preferably set to 1.

Subsequently, the block detection unit 105 determines whether the parameter len thus set is less than len$_{min}$ representing the minimum number of unit blocks (step S119). When the parameter len thus set is determined to be equal to or more than len$_{min}$, the block detection unit 105 returns back to step S105 to continue the detection processing of blocks. On the other hand, when the parameter len thus set is determined to be less than len$_{min}$, the block detection unit 105 determines whether there is any block that has not yet been subjected to the detection processing (step S121). When there are blocks that have not yet been subjected to the detection processing, the block detection unit 105 returns back to step S101 to continue the detection processing of blocks. When there are no blocks that have not yet subjected to the detection processing, the block detection unit 105 terminates the detection processing of blocks.

By performing the above-described processing, the block detection unit 105 can detect the blocks in the Hough space binary image. As a result, the block detection unit 105 can encode the Hough space binary image, and can reduce the amount of data of the Hough space binary image.

The block detection method according to the present embodiment has been hereinabove described.

In the above description, the same maximum number of unit blocks is applied to all of the blocks. Alternatively, different maximum numbers of unit blocks may be respectively applied to the blocks. For example, detection processing is performed using the blocks arranged in diagonal directions such as diagonally right down arrangement and diagonally right up arrangement, before detection processing is performed using the horizontally arranged blocks and the vertically arranged blocks. In such case, when detection processing is performed using the horizontally arranged blocks and the vertically arranged blocks, pixels connected to form a long arrangement are less likely to be remaining. For this reason, the maximum number of unit blocks for the horizontally arranged blocks and the vertically arranged blocks may be set to a value smaller than the maximum number of unit blocks for the blocks arranged in a diagonal direction. By setting the maximum number of unit blocks in the above manner, the efficiency of the block detection processing can be improved, and the time for the block detection processing can be reduced.

In the above description, the block detection processing is performed on a certain block while the number of unit blocks is changed from the maximum number of unit blocks to the minimum number of unit blocks, and thereafter the block detection processing is performed on another block. However, the block detection method according to the embodiment of the present invention is not limited to the above example. Alternatively, the block detection processing may be performed using all kinds of blocks having the number of unit blocks in question, and thereafter the number of unit blocks may be changed.

<Modification of Information Processing Apparatus>

Figure 15:
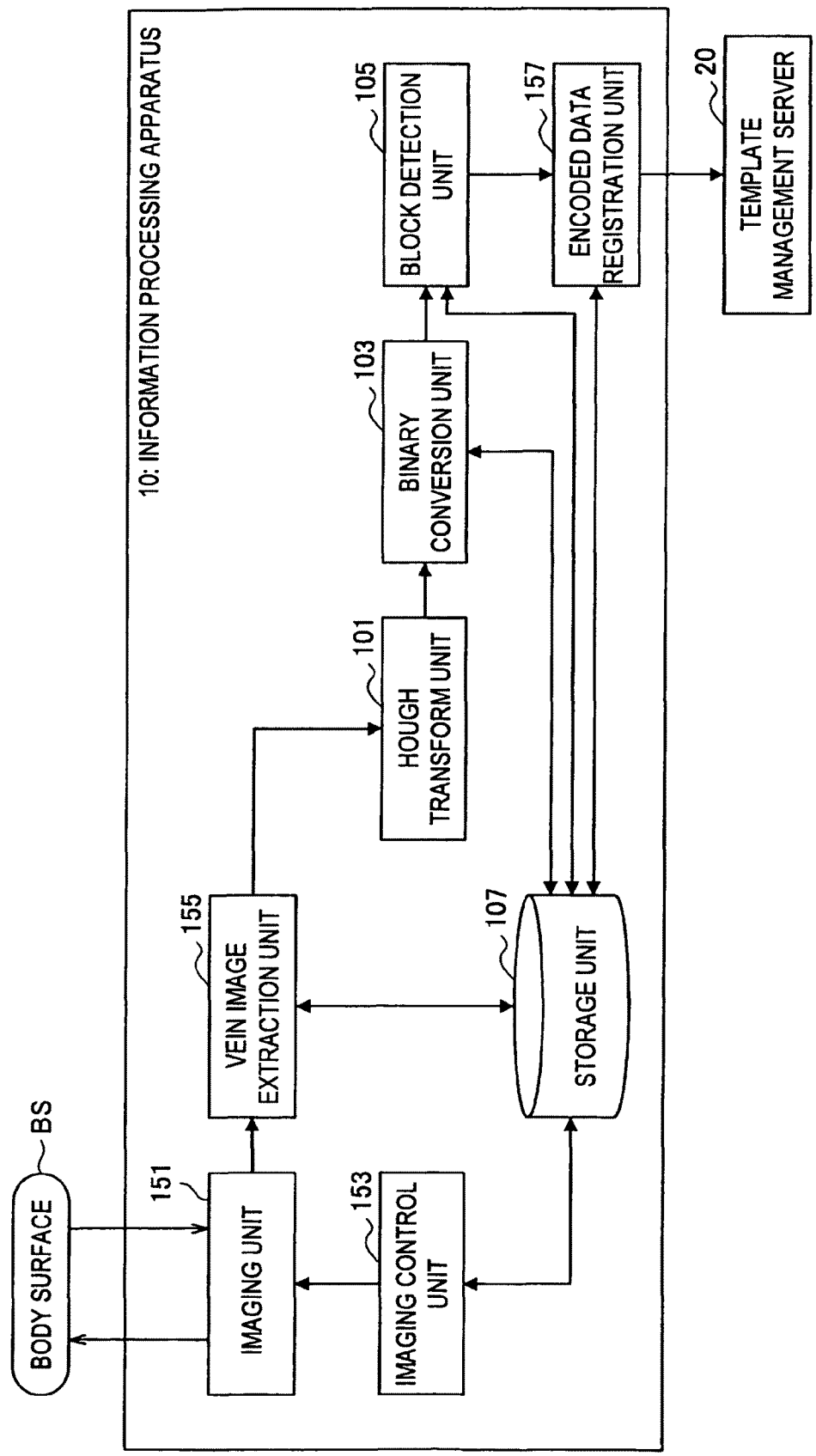
FIG. 15 is a block diagram illustrating a configuration of a modification of the information processing apparatus according to the embodiment.

Subsequently, a modification of the information processing apparatus according to the present embodiment will be described in detail with reference to FIG. 15. FIG. 15 is a block diagram illustrating the modification of the information processing apparatus according to the present embodiment.

For example, as shown in FIG. 15, the information processing apparatus 10 according to the present modification mainly includes the Hough transform unit 101, the binary conversion unit 103, the block detection unit 105, the storage unit 107, an imaging unit 151, an imaging control unit 153, a vein image extraction unit 155, and an encoded data registration unit 157.

In the following description, the Hough transform unit 101, the binary conversion unit 103, the block detection unit 105, and the storage unit 107 have the same configurations and achieve the same effects as the processing units according to the first embodiment of the present invention. Accordingly, the detailed description thereof is omitted.

The imaging unit 151 includes a light source unit emitting near-infrared light having a predetermined wavelength band onto a body surface BS and an optical system including optical elements such as the imaging element and lenses.

Because the near-infrared light has characteristics that it is well transmitted through body tissues and absorbed by hemoglobin (reduced hemoglobin) in blood, if the near-infrared light is emitted on the finger, palm or back of a hand, veins distributed inside the finger, palm or back of the hand appear as a shadow in an image. The shadow of veins that appears in an image is called a vein pattern. In order to suitably image such a vein pattern, the light source unit of the light emitting diode, and the like, emits near-infrared light having a wavelength of about 600 nm to 1300 nm or, preferably, about 700 nm to 900 nm.

If the wavelength of the near-infrared light emitted by the light source is less than 600 nm or more than 1300 nm, the percentage of light that is absorbed by hemoglobin in blood decreases, and it becomes difficult to obtain a suitable vein pattern. Also, if the wavelength of the near-infrared light emitted by the light source is about 700 nm to 900 nm, the near-infrared light is specifically absorbed by both deoxygenated hemoglobin and oxygenated hemoglobin, and it is therefore possible to obtain a suitable vein pattern.

The near infrared light exit from the light source is propagated towards the body surface BS, and enters inside from the side surface and the like of the living body as a direct light. Since a human body is a suitable scatterer of near infrared light, the direct light that entered inside the living body propagates while scattering in all directions. The near infrared light that passed through the living body enters the optical element configuring the optical system.

The optical system configuring the imaging unit 151 is configured by one or a plurality of optical elements, and one or a plurality of imaging elements.

Human skin is known to have a three-layer structure including an epidermis layer, a dermis layer and a subcutaneous tissue layer, where the vein layer in which the vein exists is in the dermis layer. The dermis layer is located at about 0.1 mm to 0.3 mm below the finger surface and has a thickness of about 2 mm to 3 mm. Thus, by setting the focal position of the optical element such as the lens at the position where the dermis layer exists (e.g. at the position that is about 1.5 mm to 2.0 mm below the finger surface), it becomes possible to efficiently condense the light transmitted through the vein layer.

The transmitted light having passed through the vein layer is condensed by an optical element to form an image on an imaging element such as a CCD and a CMOS to be made into vein imaged data. The vein imaged data corresponding to the generated vein imaged image is transmitted to the later-described vein image extraction unit 155.

The imaging control unit 153 is achieved with, for example, a CPU, a ROM, a RAM, and the like. The imaging control unit 153 controls a light source unit, an optical system, and an imaging element of the imaging unit 101 so as to generate imaged data.

The imaging control unit 153 controls the later-described vein image extraction unit 155 to output the imaged data generated by the imaging element. Further, the imaging control unit 153 may store the obtained imaged data to the storage unit 107. When the imaged data is recorded to the storage unit 107, the imaging control unit 153 may associate the generated imaged data with a date of imaging, a time of imaging, and the like. It should be noted that the generated imaged data may be an RGB (Red-Green-Blue) signal, or may be image data of other colors or in grayscale.

The vein image extraction unit 155 is achieved with, for example, a CPU, a ROM, a RAM, and the like. The vein image extraction unit 155 extracts vein image representing the user's vein pattern from among near infrared image data transmitted from the imaging unit 151. This vein image extraction unit 155 further includes processing units such as an image smoothing unit, an outline extraction unit, a mask image generation unit, a cropping unit, a vein smoothing unit, a vein image binary conversion unit, a thick line conversion unit, a thin line conversion unit, a thumbnail image generation unit, and the like.

The image smoothing unit is achieved with, for example, a CPU, a ROM, a RAM, and the like. The image smoothing unit uses, for example, a so-called Gaussian spatial filter to filter the vein imaged data given as an imaging result from the imaging control unit 153, thus smoothing the vein image corresponding to the vein imaged data.

The outline extraction unit is achieved with, for example, a CPU, a ROM, a RAM, and the like. The outline extraction unit uses, for example, a so-called Log (Laplacian of Gaussian) spatial filter to filter the vein image smoothed by the image smoothing unit, thus emphasizing the outline of the vein image to produce an engraved image.

The mask image generation unit is achieved with, for example, a CPU, a ROM, a RAM, and the like. The mask image generation unit detects an outline such as an outline of a finger, based on a contrast with respect to a background section, from the vein image whose outline has been emphasized by the outline extraction unit. The mask image generation unit generates an image (which may also be referred to as a mask image) that represents, using binary values, a finger region enclosed by the detected outline and a region other than the finger region.

The cropping unit is achieved with, for example, a CPU, a ROM, a RAM, and the like. The cropping unit uses the mask image generated by the mask image generation unit to crop out an image of a predetermined size including the finger region enclosed by the outline of the finger from the vein image whose outline has been emphasized by the outline extraction unit.

The vein smoothing unit is achieved with, for example, a CPU, a ROM, a RAM, and the like. The vein smoothing unit uses, for example, a so-called median spatial filter to filter the vein image cropped out by the cropping unit, thus smoothing the vein section in the vein image.

The vein image binary conversion unit is achieved with, for example, a CPU, a ROM, a RAM, and the like. The vein image binary conversion unit converts the vein image in which the vein section is smoothed by the vein smoothing unit into binary levels, using the configured brightness level as the reference. Now, if the vein image in which the vein has not yet been smoothed is adopted as the image to be subjected to the binary conversion, it is more likely that one vein may be separated into two veins as a result of binary conversion process even though there is only one vein in reality. On the other hand, when the vein image in which the vein is smoothed is adopted as the image to be subjected to the binary conversion process, the binary conversion process can be carried out in a state approximating to the actual vein.

The thick line conversion unit is achieved with, for example, a CPU, a ROM, a RAM, and the like. The thick line conversion unit uses, for example, a so-called dilation spatial filter to filter the vein image converted into binary values by the vein image binary conversion unit, thus making the vein in the vein image into a thicker line. As a result, this filter connects disconnected vein sections which should be connected in reality.

The thin line conversion unit is achieved with, for example, a CPU, a ROM, a RAM, and the like. The thin line conversion unit uses, for example, a so-called erosion spatial filter to filter the vein image in which the vein section is converted into a thick line by the thick line conversion unit, thus making the width of the vein in the vein section constant.

The thumbnail image generation unit is achieved with, for example, a CPU, a ROM, a RAM, and the like. The thumbnail image generation unit obtains from the thin line conversion unit the vein image that represents, using binary values, the vein section in which the width of the vein is constant and the background section, and generates a thumbnail image from this vein image by compressing the vertical and horizontal sizes by one n-th.

In this way, the vein image extraction unit 155 extracts, as vein image, the image representing, using binary values, the vein section in which the width of the vein is constant and the background section. The vein image extraction unit 155 transmits the extracted vein image (i.e., the vein image in which the vein section is converted into a thin line) to the Hough transform unit 101. It should be noted that the vein image extraction unit 155 may record, to the storage unit 107, the extracted vein image, the thumbnail image, and various kinds of information generated by each processing unit of the vein image extraction unit 155.

The encoded data registration unit 157 registers the encoded data of the Hough space binary image output by the block detection unit 105, as a template corresponding to the extracted biometrics image, to the storage unit 107 or an external template management server 20. In addition, the encoded data registration unit 157 may associate the registered template with identification information unique to the user who registers the template (for example, identification number). In addition, the encoded data registration unit 157 may further associate the registered template with feature quantity information and a thumbnail image of the biometrics image corresponding to the encoded data.

As described above, the encoded data of the Hough space binary image is registered as a template. Accordingly, the apparatus performing the biometrics authentication using this template does not have to perform the Hough transformation on the registered biometrics image in the real space in the same manner as the apparatus in related art. As a result, the apparatus performing the biometrics authentication using the template thus encoded can improve the speed of the authentication processing.

It should be noted that the encoded data registration unit 157 may register multiple encoded data having different degrees of encoding as templates, so as to improve the convenience of the user. Multiple data having high degree of encoding may be registered as templates, so that the accuracy of authentication can be ensured.

A modified example of the functions of the information processing apparatus 10 according to the present embodiment has been hereinabove described. Each of the above constituent elements may be structured using a general-purpose member and a circuit, or may be structured by hardware dedicated to the function of the respective constituent element. Alternatively, the function of each constituent element may be carried out by a CPU and the like. Therefore, the used configuration may be changed as necessary in accordance with the state of art at the time of carrying out the present modified example.

It is possible to make a computer program for realizing the functions of the above-described information processing apparatus according to the present modified example, and the computer program can be implemented on a personal computer and the like. Further, a computer-readable recording medium storing such computer program can be provided. Examples of the recording medium include a magnetic disk, an optical disk, a magneto-optical disk, and a flash memory. Further, the above computer program may be distributed by, for example, a network, without using the recording medium.

(Regarding Hardware Configuration)

Figure 16:
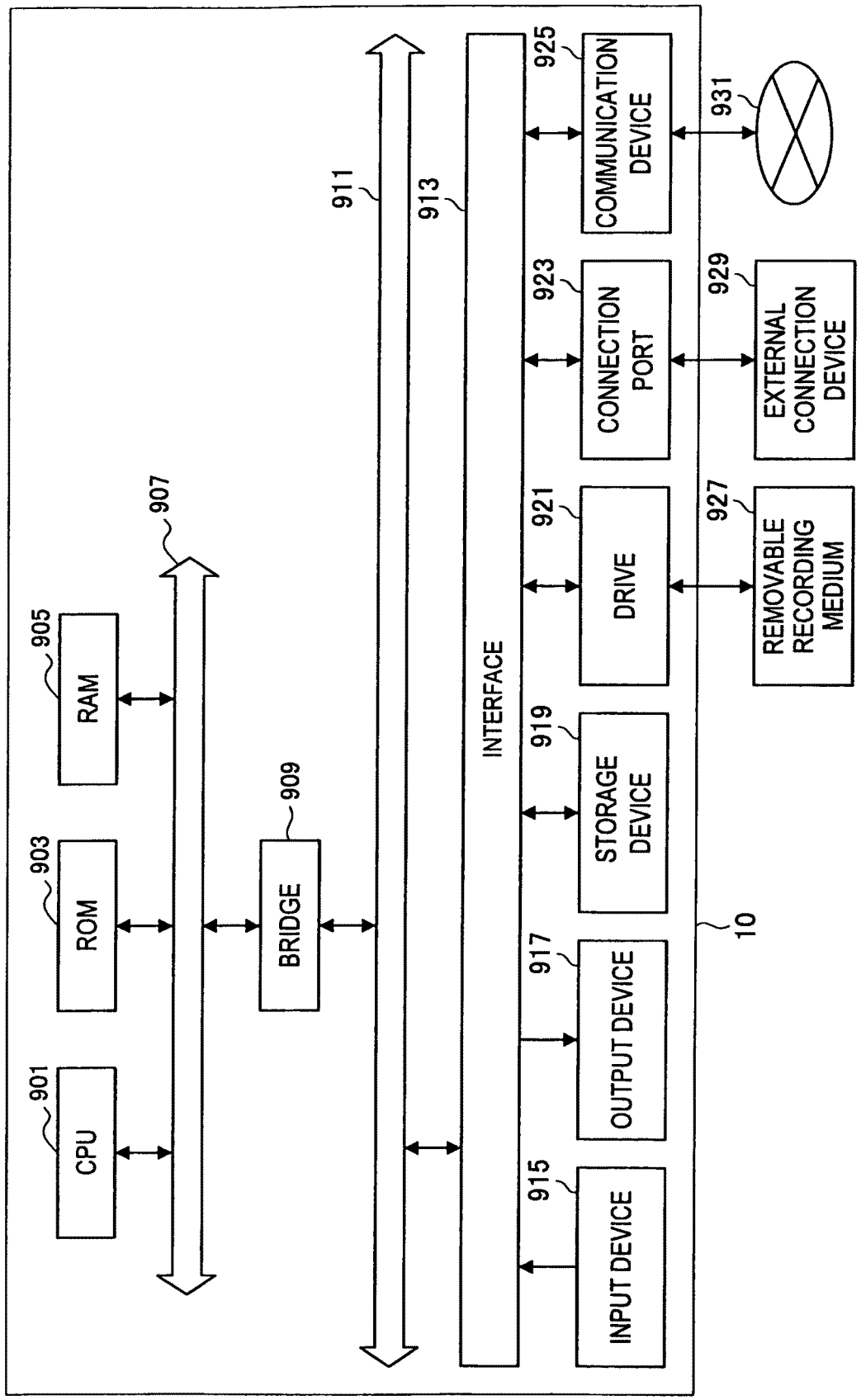
FIG. 16 is a block diagram illustrating a hardware configuration of an information processing apparatus according to the embodiment of the present invention.

Subsequently, a hardware configuration of the information processing apparatus 10 according to the embodiment of the present invention will be described in detail with reference to FIG. 16. FIG. 16 is a block diagram illustrating a hardware configuration of the information processing apparatus 10 according to the embodiment of the present invention.

The information processing apparatus 10 mainly includes a CPU 901, a ROM 903, and a RAM 905. Further, the information processing apparatus 10 includes a host bus 907, a bridge 909, an external bus 911, an interface 913, an input device 915, an output device 917, a storage device 919, a drive 921, a connection port 923, and a communication device 925.

The CPU 901 functions as a processing unit and a control unit, and it controls the whole or a part of operation in the information processing apparatus 10 according to various kinds of programs stored in the ROM 903, the RAM 905, the storage device 919 or a removable recording medium 927. The ROM 903 stores a program to be used by the CPU 901, a processing parameter and the like. The ROM 903 stores a program to be used by the CPU 901, a processing parameter and so on. The RAM 905 primarily stores programs used by the CPU 901 in the execution, parameters and the like that are changed during the execution. The CPU 901, the ROM 903 and the RAM 905 are connected with one another through the host bus 907, which is an internal bus such as a CPU bus.

The host bus 907 is connected to the external bus 911 such as a Peripheral Component Interconnect/Interface (PCI) bus via the bridge 909.

The input device 915 is an operating means to be operated by a user, such as a mouse, a keyboard, a touch panel, buttons, a switch or a lever, for example. For example, the input device 915 may be a remote controlling means (or a remote control) with an infrared ray or another radio wave, or an externally connected device 929 compatible with the operation of the information processing apparatus 10, such as a cellular phone or a PDA. Further, the input device 915 includes an input control circuit that generates an input signal based on information input by a user using the above operating means and outputs it to the CPU 901, for example. By operating this input device 915, a user of the information processing apparatus 10 can input various kinds of data or give an instruction of a processing operation to the information processing apparatus 10.

The output device 917 includes an apparatus capable of visually or audibly notifying obtained information to the user. Examples of such apparatus include a display device such as a CRT display device, a liquid crystal display device, a plasma display device, an EL display device or a lamp, an audio output device such as a speaker or a headphone, or a printer, a cellular phone or a facsimile. The output device 917 outputs, for example, results obtained by various processing by the information processing apparatus 10. Specifically, the display device displays, as a text or an image, a result obtained by various processing of the information processing apparatus 10. The audio output device converts an audio signal containing reproduced audio data, acoustic data or the like into an analog signal and outputs it.

The storage device 919 is a device for data storage that is configured as an example of a storage unit of the information processing apparatus 10. The storage device 919 may include a magnetic storage device such as a hard disk drive (HDD), a semiconductor storage device, an optical storage device, a magneto-optical storage device or the like. This storage device 919 stores a program to be executed by the CPU 901, various data, or various data acquired from the outside, for example.

The drive 921 is a reader/writer for a recording medium, which is built in the information processing apparatus 10 or attached thereto. The drive 921 reads information that is recorded in the removable recording medium 927 such as a magnetic disk, an optical disk, a magneto-optical disk or semiconductor memory which is attached thereto and outputs the information to the RAM 905. Further, the drive 921 can write information into the removable recording medium 927 such as a magnetic disk, an optical disk, a magneto-optical disk or semiconductor memory which is attached thereto. Examples of the removable recording medium 927 include a DVD medium, an HD-DVD medium, and a Blu-ray medium. In addition, examples of the removable recording medium 927 include a compact flash (registered trademark) (CF), a memory stick, and a secure digital (SD) memory card. Further, the removable recording medium 927 may be an integrated circuit (IC) card equipped with a contactless IC chip or an electronic appliance.

The connection port 923 is a port for directly connecting devices to the information processing apparatus 10. Examples of the connection port 923 include a universal serial bus (USB) port, an IEEE 1394 port such as i.Link, and a small computer system interface (SCSI) port. In addition, examples of the connection port 923 include an RS-232C port, an optical audio terminal, and a high-definition multimedia interface (HDMI) port. By connecting the externally connected device 929 to the connection port 923, the information processing apparatus 10 can directly acquire various data from the externally connected device 929 or supply various data to the externally connected device 929.

The communication device 925 is a communication interface that is constituted by a communication device or the like for connecting to a communication network 931, for example. The communication device 925 may be a communication card for wired or wireless local area network (LAN), Bluetooth (registered trademark), or wireless USB (WUSB). Alternatively, the communication device 925 may be a router for optical communication, a router for asymmetric digital subscriber line (ADSL), or a modem for each kind of communication. This communication device 925 can transmit and receive a signal or the like in conformity to a prescribed protocol such as TCP/IP on the Internet or with other communication devices, for example. Further, the communication network 931 that is connected to the communication device 925 includes a wired or wireless network or the like, and it may be the Internet, home LAN, infrared data communication, radio wave communication, satellite communication or the like.

An example of the hardware configuration that can implement the functions of the information processing apparatus 10 according to each embodiment of the present invention has been described in the foregoing. Each of the above-described elements may be constituted using a general-purpose member or circuit, or it may be constituted by hardware specialized to the function of each element. It is thereby possible to change the configuration to be used as appropriate according to the technique level when implementing the embodiment.

SUMMARY

As hereinabove described, the information processing apparatus and the block detection method according to the embodiment of the present invention can encode the biometrics image to which the Hough transformation has been applied, thus reducing the amount of data. As a result, even a medium limited in the amount of storable data, such as an IC card and a secure chip, can store the biometrics image to which the Hough transformation has been applied.

Further, when the encoded Hough space image is registered as the template, the apparatus performing the biometrics authentication using the template does not have to perform the Hough transformation on the template, in contrast to the apparatus in related art that has to perform the Hough transformation on the template. As a result, the apparatus performing the biometrics authentication using the template can improve the speed of the processing, thus improving the convenience of the user.

It is extremely difficult to inversely transform the Hough-transformed image into an image in the real space. Therefore, in the event that the template using the encoded data is known to others, spoofing using the image in the real space can be prevented. In addition, due to the difficulty of the inverse transformation, the templates can be moved more easily than the templates in related art using the images in the real space.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
 a Hough transform unit executing Hough transformation on a biometrics image which is image information unique to a living body; and
 a block detection unit detecting whether a block having a predetermined shape is included in a Hough space image which is a Hough-transformed biometrics image, outputting present position information representing a position at which the block is located in the Hough space image when the block is determined to be included in the Hough space image,
 the block including a plurality of unit blocks, each having a predetermined size, which are connected with a predetermined inclination,
 the block detection unit detects the block by using a plurality of types of blocks in which the unit blocks are connected in different manners, in which the different manners include (i) a diagonally right down arrangement, (ii) a diagonally right up arrangement, (iii) a horizontal arrangement, and (iv) a vertical arrangement, and
 the block detection unit performs detecting processing using the diagonally right down arrangement and the diagonally right up arrangement before using the horizontal arrangement and the vertical arrangement.

2. The information processing apparatus according to claim 1,
 wherein
 the block detection unit detects the block by also using a plurality of blocks in which the unit blocks are connected in the same manner but the numbers of unit blocks constituting the blocks are different.

3. The information processing apparatus according to claim 2,
 wherein the block detection unit outputs the shape of the block, the number of unit blocks constituting the block, and the present position information of the block, which are associated with each other, for each of the blocks included in the Hough space image.

4. The information processing apparatus according to claim 3, further comprising a binary conversion unit for converting the Hough space image into binary values based on the number of votes in the Hough space image, and generating the Hough space binary image which is a Hough space image converted into binary values, wherein when the number of votes is equal to or more than a predetermined threshold value, the binary conversion unit determines that a vote is cast for a corresponding portion, when the number of votes is less than the predetermined threshold value, the binary conversion unit determines that a vote is not cast for the corresponding portion, and the block detection unit detects the block on the Hough space binary image.

5. The information processing apparatus according to claim 3, wherein the block detection unit detects the plurality of blocks in which the unit blocks are connected in the same manner, in descending order of the number of unit blocks constituting the block.

6. A block detection method comprising the steps of:

executing Hough transformation on a biometrics image which is image information unique to a living body; and detecting whether a block having a predetermined shape is included in a Hough space image which is a Hough-transformed biometrics image, and outputting present position information representing a position at which the block is located in the Hough space image when the block is determined to be included in the Hough space image, the block including a plurality of unit blocks, each having a predetermined size, which are connected with a predetermined inclination, the detecting step detects the block by using a plurality of types of blocks in which the unit blocks are connected in different manners, in which the different manners include (i) a diagonally right down arrangement, (ii) a diagonally right up arrangement, (iii) a horizontal arrangement, and (iv) a vertical arrangement, and the detecting step performs detecting processing using the diagonally right down arrangement and the diagonally right up arrangement before using the horizontal arrangement and the vertical arrangement.

7. A non-transitory computer readable medium having stored thereon a program for causing a computer to achieve:

a Hough transform function for executing Hough transformation on a biometrics image which is image information unique to a living body; and a block detection function for detecting whether a block having a predetermined shape is included in a Hough space image which is a Hough-transformed biometrics image, and outputting present position information representing a position at which the block is located in the Hough space image when the block is determined to be included in the Hough space image, the block including a plurality of unit blocks, each having a predetermined size, which are connected with a predetermined inclination, the detection function detects the block by using a plurality of types of blocks in which the unit blocks are connected in different manners, in which the different manners include (i) a diagonally right down arrangement, (ii) a diagonally right up arrangement, (iii) a horizontal arrangement, and (iv) a vertical arrangement, and the detection function performs detecting processing using the diagonally right down arrangement and the diagonally right up arrangement before using the horizontal arrangement and the vertical arrangement.

\* \* \* \* \*